United States Patent
McDonnell (10) Patent No.: US 7,070,149 B2
(45) Date of Patent: Jul. 4, 2006

(54) SEATS THAT CONVERT TO SLEEPER BUNKS

(75) Inventor: William R. McDonnell, St. Louis, MO (US)

(73) Assignee: Advanced Product Development, LLC, St. Louis, MO (US)

( * ) Notice: Subject to any disclaimer, the term of this patent is extended or adjusted under 35 U.S.C. 154(b) by 0 days.

(21) Appl. No.: 10/380,654

(22) PCT Filed: Sep. 19, 2001

(86) PCT No.: PCT/US01/42209

§ 371 (c)(1),
(2), (4) Date: Mar. 13, 2003

(87) PCT Pub. No.: WO02/24527

PCT Pub. Date: Mar. 28, 2002

(65) Prior Publication Data

US 2004/0035980 A1  Feb. 26, 2004

Related U.S. Application Data

(60) Provisional application No. 60/233,727, filed on Sep. 19, 2000, provisional application No. 60/305,504, filed on Jul. 16, 2001.

(51) Int. Cl.
*B64D 11/00* (2006.01)
(52) U.S. Cl. .................................................. 244/118.5
(58) Field of Classification Search ............ 244/118.5, 244/118.6; 105/322; 5/9.1, 8
See application file for complete search history.

(56) References Cited

U.S. PATENT DOCUMENTS

| | | | | |
|---|---|---|---|---|
| 246,082 | A | * | 8/1881 | Coffin .......................... 105/322 |
| 551,705 | A | * | 12/1895 | Anderson .................... 105/322 |
| 964,540 | A | | 7/1910 | Niemeyer et al. |
| 1,182,830 | A | * | 5/1916 | Woicula ...................... 105/315 |
| 1,647,733 | A | * | 11/1927 | Keichline .................... 160/127 |
| 1,995,416 | A | * | 3/1935 | Carcanagues ............... 105/322 |
| 2,081,529 | A | | 5/1937 | Canney |
| 2,092,655 | A | | 9/1937 | Page, Jr. |
| 2,124,003 | A | | 7/1938 | McDonnell, Jr. et al. |
| 2,280,065 | A | * | 4/1942 | De Roode ............... 244/118.6 |
| D155,777 | S | * | 11/1949 | Butler ........................ D12/195 |
| 2,608,366 | A | * | 8/1952 | Jergenson ................ 244/118.6 |
| 3,650,556 | A | * | 3/1972 | Ratcliff ........................ 296/171 |
| 3,898,704 | A | * | 8/1975 | Gallaher et al. ................. 5/2.1 |
| 4,044,410 | A | | 8/1977 | Klingler |
| 4,051,564 | A | | 10/1977 | Gudish |
| 4,071,210 | A | * | 1/1978 | Mutke ..................... 244/118.6 |
| 4,440,439 | A | | 4/1984 | Szabo |
| 4,555,821 | A | | 12/1985 | Page |

(Continued)

*Primary Examiner*—Tien Dinh
(74) *Attorney, Agent, or Firm*—Polster, Lieder, Woodruff & Lucchesi (57) ABSTRACT

Passenger accommodations are easily and rapidly convertible from conventional seats to bunk beds and back. A support structure (9) supports a seat pad (13) and a seat pad extension (15) and also rotatably supports a seat back (5). The seat pad extension (15) and seat back (5) are partially supported by the support structure (9) of a row of seats ahead of the convertible seats when the convertible seats are converted to bunk beds. A third bunk bed (21,23) may be unfolded under the lower bunk bed formed by the seat pad (13, 15).

33 Claims, 11 Drawing Sheets

U.S. PATENT DOCUMENTS

| | | | |
|---|---|---|---|
| 4,589,612 A * | 5/1986 | Halim | 244/118.6 |
| 5,333,818 A | 8/1994 | Brandt et al. | |
| 5,425,516 A | 6/1995 | Daines | |
| 5,482,230 A * | 1/1996 | Bird et al. | 244/121 |
| 5,716,026 A | 2/1998 | Pascasio et al. | |
| 5,740,989 A * | 4/1998 | Daines | 244/118.6 |
| 5,894,616 A * | 4/1999 | Graham et al. | 5/424 |
| 5,992,798 A | 11/1999 | Ferry | |
| 6,000,174 A | 12/1999 | Yamazaki | |
| 6,000,659 A | 12/1999 | Brauer | |
| 6,056,239 A * | 5/2000 | Cantu et al. | 244/118.6 |
| 6,155,519 A | 12/2000 | Rajasingham | |
| 6,209,956 B1 | 4/2001 | Dryburgh et al. | |
| 6,237,872 B1 * | 5/2001 | Bar-Levav | 244/118.6 |

* cited by examiner

SEATS THAT CONVERT TO SLEEPER BUNKS

CROSS-REFERENCE TO RELATED APPLICATIONS

This national phase application under 35 U.S.C. § 371 of PCT application PCT/US01/42209 claims priority of Provisional Applications 60/305,504, filed Jul. 16, 2001, and 60/233,727, filed Sep. 19, 2000.

TECHNICAL FIELD

The present invention relates to passenger accommodations which are easily and rapidly convertible from conventional seats to bunk beds. The accommodations provide privacy and in the preferred embodiment allow all passengers to get to an aisle without having to wake up other passengers or have other passengers move out of the way.

BACKGROUND ART

Sleeper accommodations in transportation are a well-known concept. They have been widely used on passenger trains, on ships, and also on aircraft. Achieving a satisfactory approach to convert airliner seats to sleeper bunks is complicated by safety considerations and the need for a lightweight, sturdy and high density configuration. In almost all prior art the passengers are facing forward or aft in both seated and prone positions. This arrangement requires every passenger to be next to an aisle or else some passengers must either wake-up or crawl over adjacent passengers to get to an aisle. One exception is Brauer, U.S. Pat. No. 6,000,659, which discloses a complicated and heavy approach of rotating side by side seats ninety degrees. This approach is also only suitable for a two-abreast bank of seats without a bunk bed arrangement and does not provide anywhere near the passenger density required for economy class.

Another exception is Mutke, U.S. Pat. No. 4,071,210, where passengers are always facing at right angles to the direction of travel and are always stacked vertically when seated or prone.

Prior to the present invention, nothing in the art allowed for three levels of bunk beds that could convert to the normal seated arrangement which is required for a speedy evacuation in case of an emergency during takeoff or landing. There is not enough time for people to be climbing down stairs or ladders and interfering with others moving along the aisles trying to exit. However a three level bunk arrangement is required to get the stretch out distance for passengers to lie prone for economy class passenger densities.

Some other unique design considerations for airliners seats include the requirement for an open view of the cabin during takeoff and landing so that the flight attendant can see persons who get up out of their seats, which often is the first indication of a problem. As a result, seats that convert to bunk beds in closed compartments typical of train sleeper cars would not be allowable on an airliner.

Modern airliner seats also need to be designed to withstand sixteen-g crash loads, and special accommodations are required if passengers are not facing close to straight forward or aft.

SUMMARY OF THE INVENTION

The present invention provides improvements in seats that convert to bunk beds.

In accordance with one aspect of the invention, a bunk bed system is provided that converts to seats. The system comprises a three level bunk bed where occupants of the bunk beds are spaced vertically relative to each other. The bunk beds are convertible into seats. After conversion to seats, the hips of the occupants of those seats are closer to the same altitude than they were when they were lying in the bunk beds, thus making for an easier, faster and more consistent approach for entry and exit from the seats when in the seated configuration.

Embodiments of the invention provide airliner seats that convert to bunk beds that meet the safety requirements of having an open cabin with side-by-side seating and rows of seats at a normal floor level. As is well known, an airliner conventionally includes an airframe having at least one lifting surface, a propulsion system, and seats mounted in the airframe.

Preferred embodiments of the invention provide a conventional-looking seating arrangement that converts to bunk beds where all passengers can get to an aisle without waking other passengers and asking them to move.

Preferred embodiments of the invention provide a conventional looking airliner seating arrangement that converts to bunk beds to allow all passengers to lie prone even in high density economy class.

Preferred embodiments of the invention provide seats that convert to one-, two- or three-level bunk beds.

Preferred embodiments of the invention provide a simpler and lighter way of building seats that convert to bunk beds.

Preferred embodiments of the invention provide an improved means of climbing into the upper berth.

Preferred embodiments of the invention reduce the seat loads on the passenger floor during a crash.

Preferred embodiments of the invention provide improved partitions between prone passengers.

The present invention includes convertible seats in an open cabin with retractable partitions for takeoff and landing that can be extended when necessary to achieve privacy between passengers when in the bunk bed configuration.

In a preferred embodiment of the current invention the passengers are seated facing forward and/or backward at a normal height above the floor for rapid exit in an emergency but are stretched out at right angles to the direction of flight and spaced vertically while in a prone position. This approach allows four major advantages: 1) After conversion to bunk beds, all passengers can get to an aisle without having to ask someone to wake up and get up to let them out. 2) A fixed partition just behind the seat back provides a natural divider between passengers when in the bunk bed configuration so they're not lying down next to a stranger. 3) A simple lightweight approach can be used to convert to multi-level bunks where the couch style one piece seat pad for three abreast passengers can be used as one bunk and the one piece couch style seat back can rotate up to provide another bunk and a third passenger can stretch out on a padded floor under the other two passengers. 4) A rapid evacuation can be executed after an accident since for takeoff and landing the passengers are seated in a standard conventional layout at floor level.

The preferred embodiment of this invention also allows the passengers or flight attendant to set up the bunks in either a one-, two- or three-level bunk bed arrangement depending on the number of passengers sitting in that particular bank of three seats. Setting up the bunks with only one or two levels provides greater headroom than with three levels.

This invention is also applicable to other forms of transportation such as trains, boats or buses. In these other transportation forms a one or two abreast seating is more common. For these situations an alternative approach can be used where the passengers remain facing forward and aft when both seated and prone.

BEST MODE FOR CARRYING OUT THE INVENTION

Figure 1:
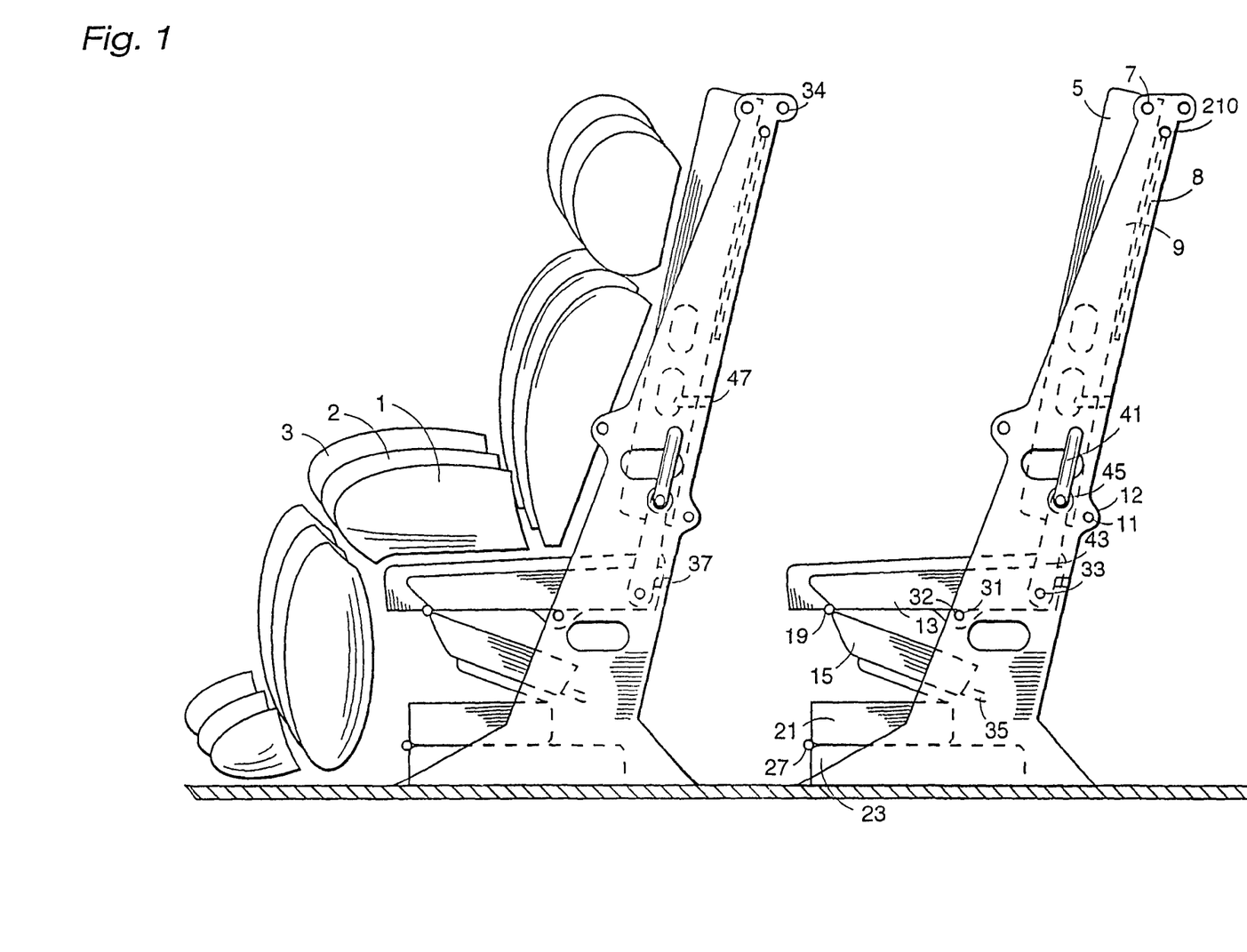
FIG. 1 is a side view of one embodiment of the seating system of the invention with the system positioned to form two rows of three conventional side-by-side seats.
Figure 5:
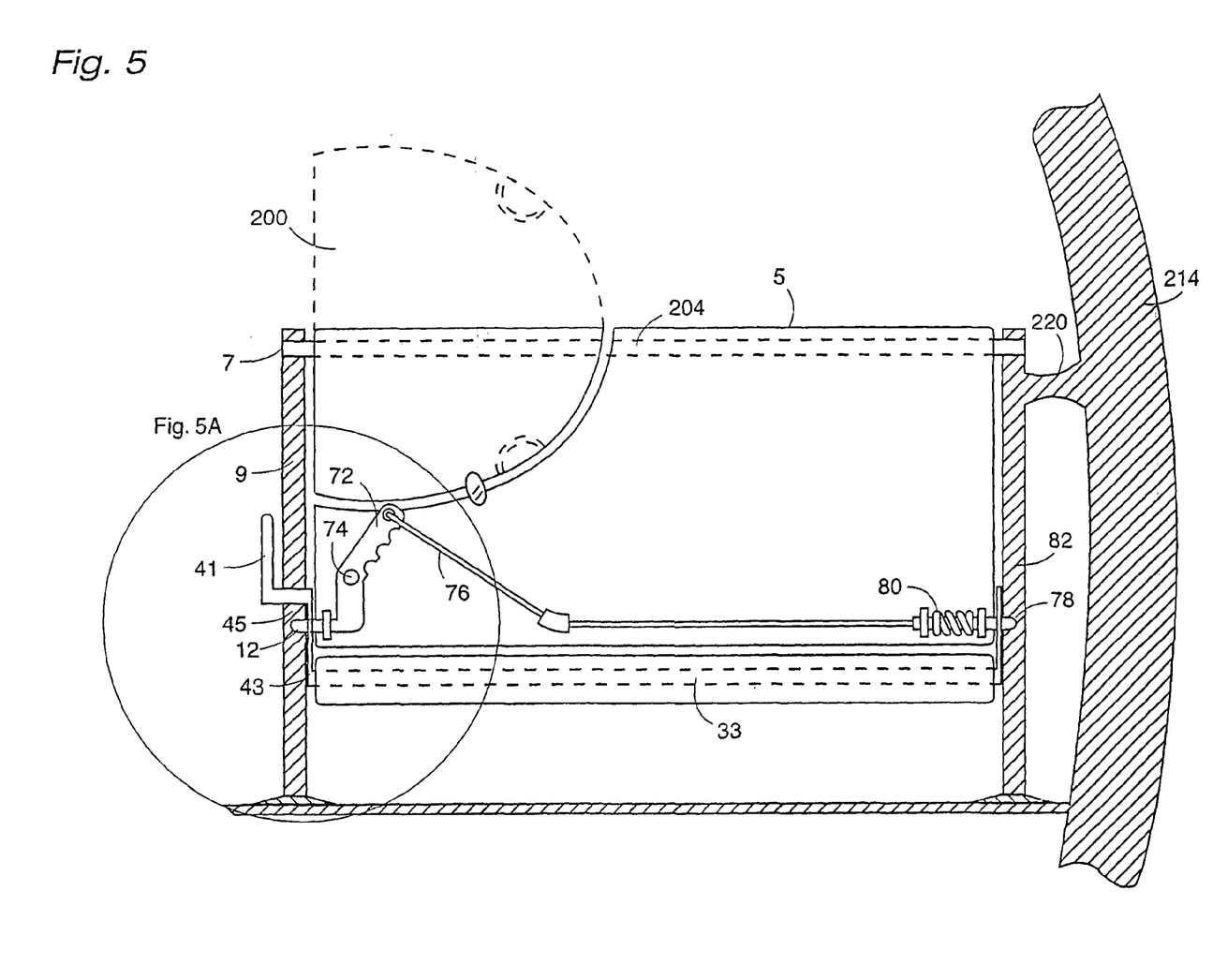
FIG. 5 is a view looking forward at the back of one row of seats of the embodiment of FIGS. 1–4 while the system is configured as conventional seats.
Figure 5A:
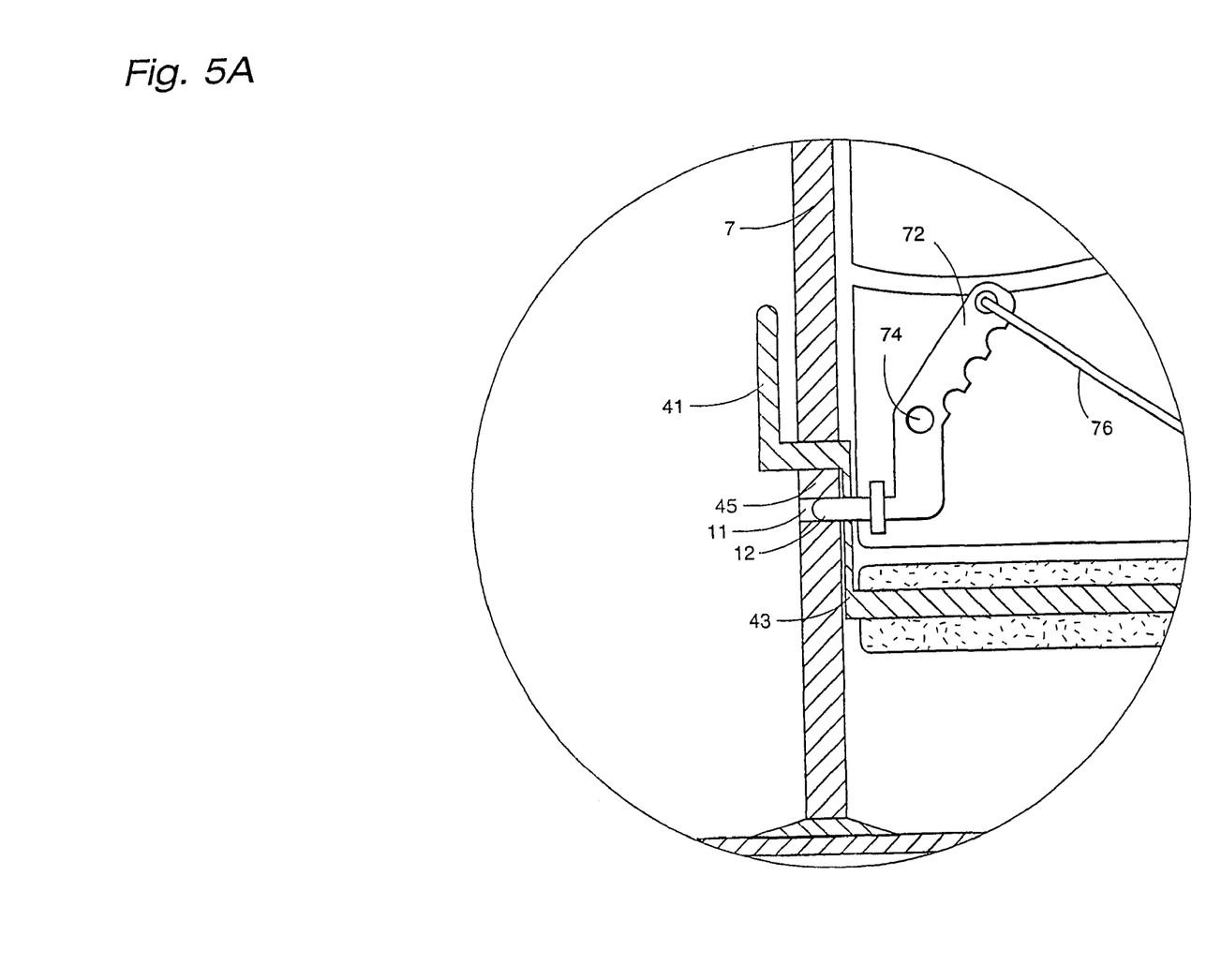
FIG. 5a is a detail of a portion of FIG. 5

Referring now to FIG. 1, there is shown the presently preferred embodiment of the invention from a side view. For takeoff and landing all the airline passengers would be seated in a conventional open cabin arrangement such as shown by passengers 1, 2 and 3 in FIG. 1. The passengers who are seated in fore and aft oriented rows, separated by one or more aisles, of preferably three abreast side-by-side seating as can be found on current airliners. During meal service or while reading or working the passengers could remain in a seated position as shown by passengers 1, 2 and 3. To reduce the cost and weight certain items can be eliminated such as arm rests. The weight and complexity can also be reduced by eliminating individual adjustable seat backs. The seat pad 13 and seat back 5 are couch style made in one piece to provide the seating for the three adjacent passengers. The top of seat back 5 is attached at hinge 7 to seat support structure 9, and the bottom of seat back 5 is secured in position by pins 12 on the bottom left and right back side of seat back 5. The pins 12 engage a hole 11 in the seat side panel support structure 9. Pin 12 is orthogonal to the plane of the drawing in FIGS. 1–3. The seat pad 13 is also held in position by a similar pin 31 on left and right sides of the seat. The pins 31 also engage a hole 32 in seat side panel support structure 9. A mechanism, described hereinafter with reference to FIG. 5, is used to retract these pins when ready to convert to the bunk bed configuration.

Figure 2:
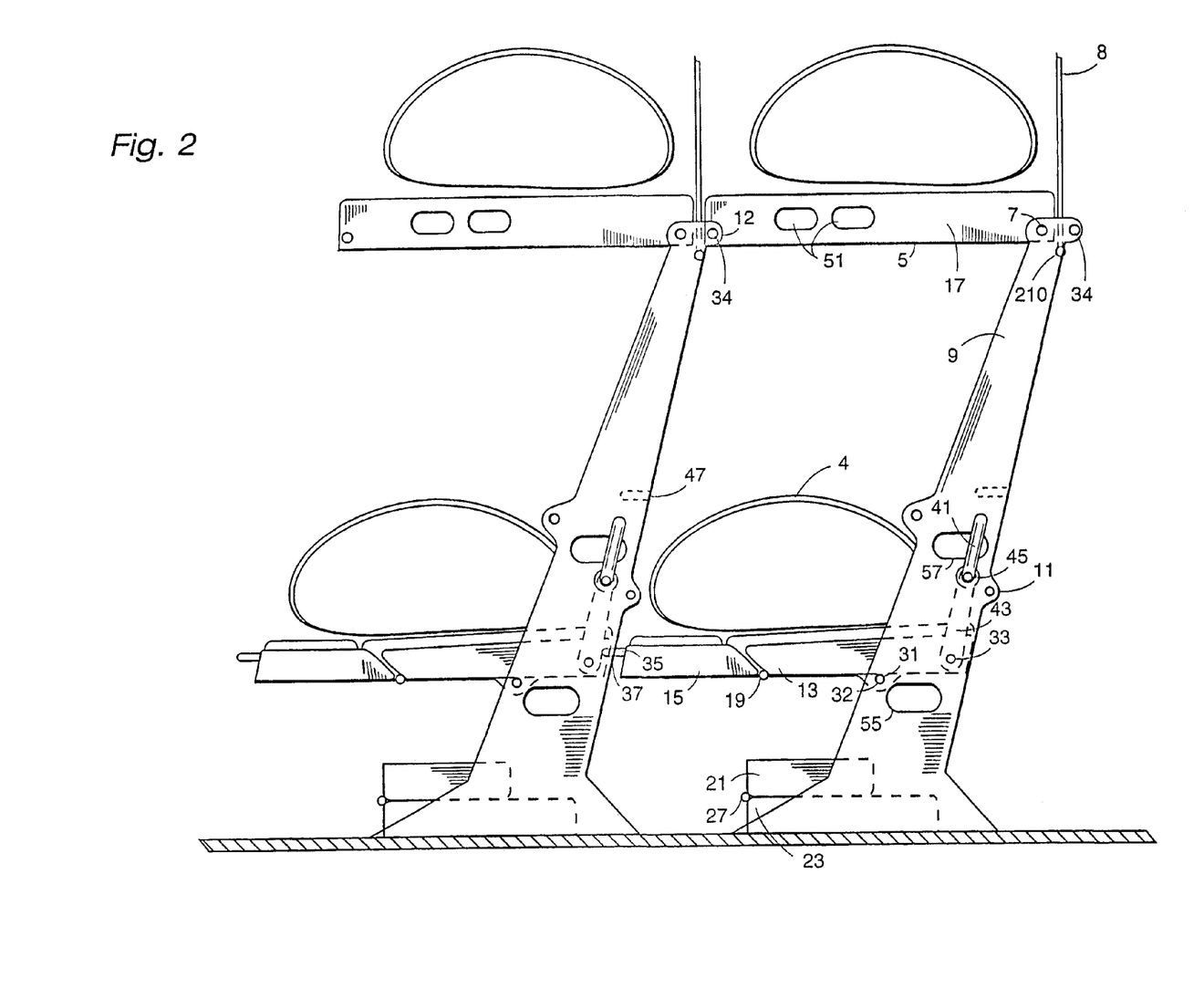
FIG. 2 is a side view of the embodiment of FIG. 1 after conversion to two level bunk beds.

To convert to two-level bunk beds as shown in FIG. 2, seat back 5 rotates clockwise and up about pin 7 to a horizontal attitude where it forms an upper bunk 17, and seat pad extension 15 rotates clockwise and up about hinge 19 until it is level with seat pad 13 to form the lower bunk that passenger 4 is lying on. It can be seen that the passengers lie prone facing at right angles to the direction that the passengers face when in a seated position. Pins 12 engage holes 34 in the seat support structure 9 of the seat in front to hold seat back 5 in the extended position to form upper bunk 17. Seat pad extension 15 also works in a similar manner. First spring loaded pin 31, which is mounted to the seat pad 13, is retracted from a hole 32 in the seat side panel support structure 9 so that the seat pad 13 can rotate clockwise and up slightly around rod 33. Seat pad extension 15 is then rotated clockwise and up about hinge 19 until fixed pin 35 is lined up with a hole 37 in the back of the seat structure in front of the seat being converted. Seat pad 13 is then rotated counter clockwise back down again about rod 33 which drives pin 35 deep into hole 37 and causes spring loaded sliding pin 31 to re-engage the hole 32 in the seat side panel support structure 9. Pin 31 might instead engage a hole (not shown) that is identical to hole 32 but slightly lower in order to place the seat pad 13 in a more level position for use as a bunk.

Converting to a single-level bunk bed is the same as the two level except the seat back 5 is left in the down position.

Figure 3:
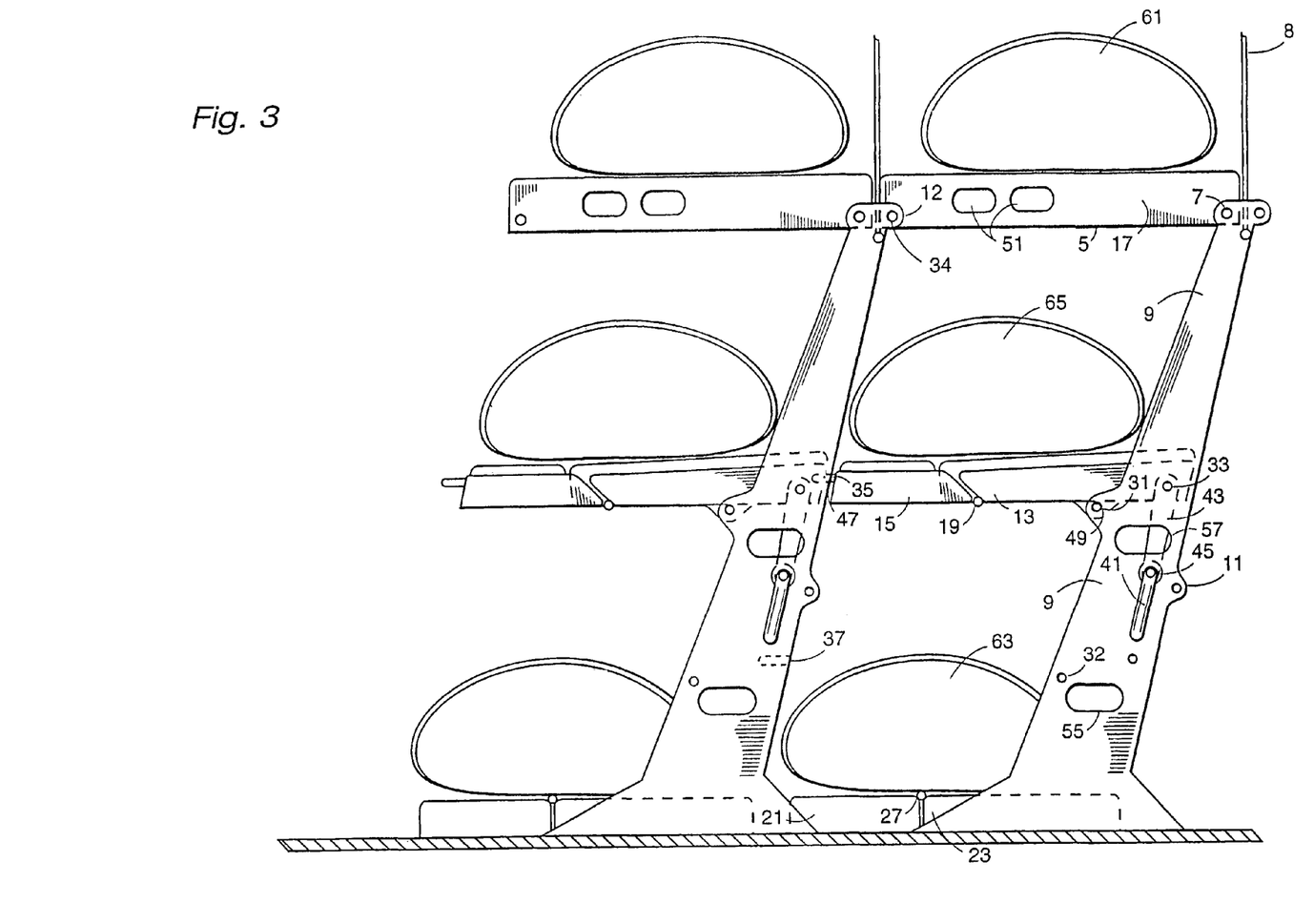
FIG. 3 is a side view of the embodiment of FIGS. 1 and 2 after conversion to three level bunk beds.

To convert to three-level bunk beds, the seat back 5 is converted into the upper bunk as previously described. The seat pad 13 and seat pad extension 15 are then raised up to form a middle bunk bed in the same manner as previously described for converting to a two-level bunk bed except for one change. A rod 33 runs along and supports the back of the seat pad 13, as can also be seen in FIG. 5, and the rod 33 is free to rotate about its lengthwise axis relative to the seat pad 13. This rod 33 is rigidly attached to one end of arm 43, shown in dashed lines in FIGS. 1, 2 and 3, behind seat side panel structure 9. Arm 43 is in turn attached through a bearing 45 to arm 41, which is in front of seat side panel structure 9 as viewed in FIGS. 1, 2 and 3. After pin 31 is retracted, lever arm 41 is rotated clockwise and down by a passenger or flight attendant to raise rod 33 and the entire back of seat pad 13 as shown in FIG. 3. Pin 35 then lines up with a different hole 47 that is higher up on the back of the seat structure in front of the seat being converted, and pin 31 lines up with and pops into a different hole 49 that is higher up on the seat side panel structure 9. As a result, seat pads 13 and 15 now form a bed that is high enough to allow a sleeper bunk underneath them where passenger 63 is sleeping. Floor pads 21 and 23 are hingedly connected along their edge 27 and are then unfolded from the stored positions shown in FIGS. 1 and 2 to the extended position where it forms a bed on the floor shown in FIG. 3 for passenger 63.

A similar mechanism to that just described for raising or lowering the middle bunk with rod 33 and arms 41 and 43 could also be used to adjust the height of the upper bunk 17.

To enter an upper bunk the passengers stabilize themselves using hand holds 51 in the side of the bunks 17 while they step up using holes 55 and 57 in seat side panel structure 9 or other fixed or retractable steps (not shown).

Figure 4:
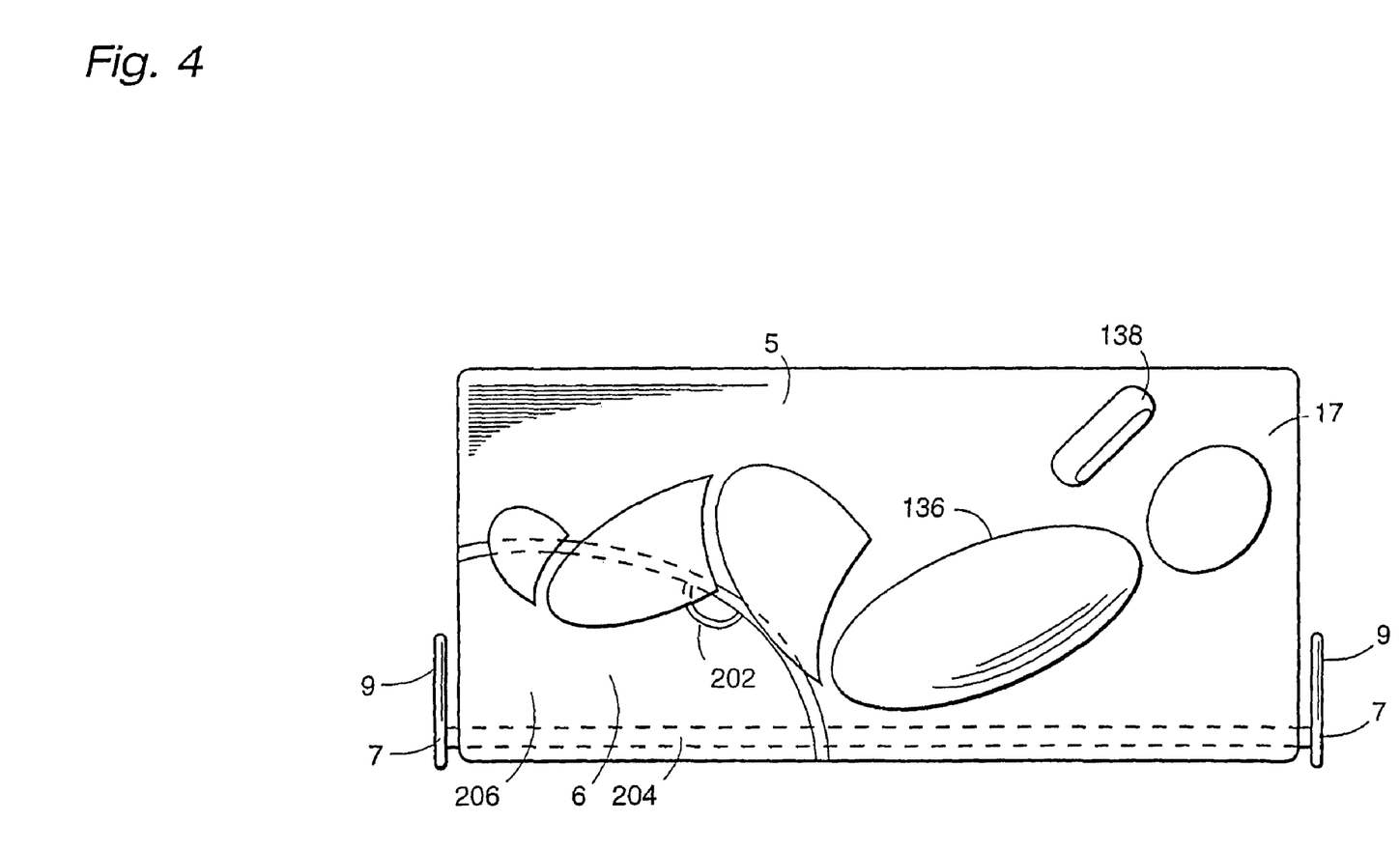
FIG. 4 is a top plan view showing a passenger lying on the top bunk of the embodiment of FIGS. 1–3.

FIG. 4 is a view looking down on a passenger 136 either sleeping or watching a movie on small flat screen TV 138 while lying on his side on the top level bunk of a three level bunk bed arrangement. The TV 138 can lie on its side on the bunk close to the passenger's face to give a large screen effect with a small TV. The TV could also be mounted on the underside of the bunk above the passenger and the passenger could view the TV while lying on his back. The TV 138 would primarily be used with the passengers in a reclined position because the ambient lighting is better controlled in the bunk bed configuration and there are fewer distractions from other passengers. However, the TV 138 could also be designed to clip onto the seat backs so that it could also be used when passengers are in a seated position. With individual screens each passenger can select which movie he wants to see and when he wants to see it.

As shown particularly in FIGS. 4 and 5, entry into the upper bunk can be made easier by having a trap door section 6 in a cutout area 206 of the upper bunk 17. Upper bunk 17 of course becomes the seat back 5 when the system is reconfigured to conventional seats. To enter the upper bunk 17 the passenger 136 first lifts trap door section 6 so that it rotates to the vertical around rod 204 to the position 200 shown in dashed lines in FIG. 5. The passenger can them step up onto the middle bunk via fixed or retractable steps (not shown) so that he is standing in cutout section 206 shown in FIG. 4. In this position while standing on the middle bunk the passenger can easily roll into the upper bunk. To exit the bunk the passenger 136 can lift the trap door 6 using fabric strap 202 and drop one leg down through cutout 206 to again stand on the middle bunk before stepping down to floor level. Alternatively cutout section 206 might be left open without a trap door and section 6 as part of the seat back 5 would remain in its down position shown in FIG. 5 whether the system was configured as conventional seats or as bunk beds.

Retractable steps can be attached to seat side panel structure 9 and fold out into the aisle to assist the passenger in stepping up onto the middle bunk. If this approach is used the steps can be mechanized to fold out when the trap door section 6 is raised and retract again when the trap door section 6 is lowered again. This can be done using a standard pull cable design that extends the step against the force of a retraction spring and is not shown for clarity. This way the retractable steps are only extended into the aisle when a passenger is entering or exiting from an upper bunk.

FIG. 5 is a view looking forward at the back of the seats with the system configured as conventional seats. This figure also shows the mechanism used to retract pins 12 to allow the seat back 5 to rotate from a seated to a bunk bed configuration or vice versa. This mechanism is essentially identical to that which retracts pins 31 also. By rotating handle 72 counter-clockwise about hinge point 74, pin 12, which is part of the handle 72, is retracted from a hole in seat support structure 9. Pull cable 76 is also actuated by the counter-clockwise rotation of handle 72 causing pin 78 to retract out of the seat support structure 82 on the right side of the seat against the force of spring 80. For clarity the partition that covers the back of the seat and provides the privacy between passengers when converted to the bunk bed configuration is not shown since it would cover the mechanism. A cut out in this partition is needed to allow handle 72 to be accessed from the back.

Figure 6:
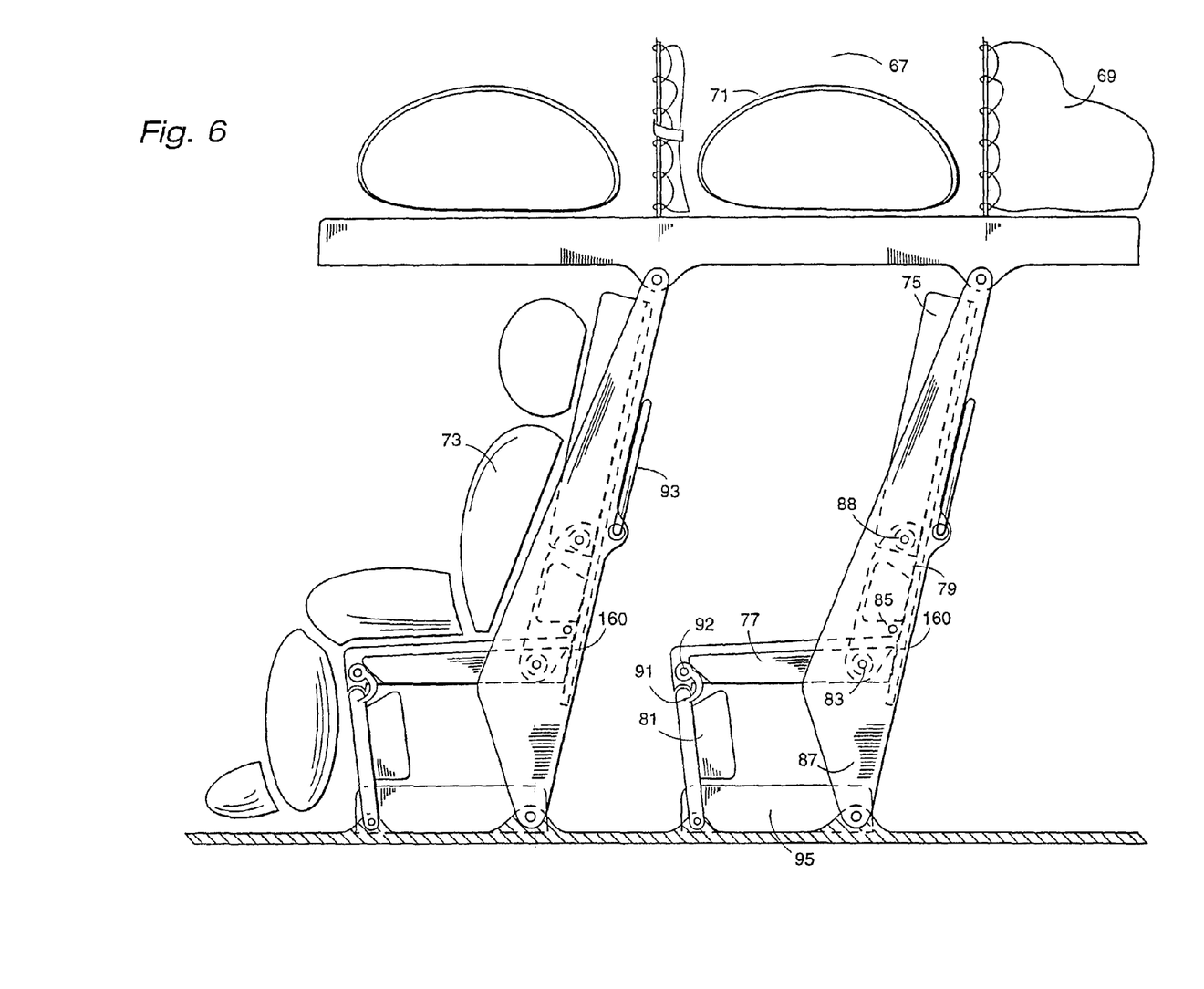
FIG. 6 is a side view of an alternate embodiment of the invention with the lower two bunks positioned to form conventional seats, wherein the upper bunk does not convert.

Referring now to FIG. 6, an alternate but in some respects less desirable embodiment of the invention is shown. In this design the upper bunks 67 and 69 stay bunks at all times and remain in a fixed position. Upper drop-down baggage storage bins such as used on the Boeing 777 could drop down almost to the top of the upper bunk on which passenger 71 is currently lying for loading of baggage and then would be pushed back up to make room for passenger 71. Passenger 73 is sitting in a seat comprised of fixed seat back 75, rotatable seat back 79 and seat pad 77. Holding up seat pads 77 at the front end is rotatable floor pad 81. Floor pad 81 fits up inside a slot on the bottom of seat pad 77 and is restrained from pulling out by hook 91 which rotates about point 92. The back of seat pad 77 is attached through a hinge 83 to rotatable seat back 79 which in turn is held in its current position by pin 85 which operates in the same manner as pins 12 and 31 described previously. To convert the seats to two lower bunks, hook 91 is rotated counter-clockwise about point 92 so as to separate the seat pad 77 and floor pad 81. Floor pad 81 is rotated counter-clockwise and down into the position shown in FIG. 7 to provide the padding along with fixed pads 95 for the lower bunk at floor level. Pin 85 is retracted so that rotatable seat back 79 can rotate clockwise and up about hinge 88 into the position shown in FIG. 7 where pin 85 again extends and engages hole 84 and holds rotatable seat back 79 in its new position. Seat pad 77 ends up being supported at one end by its hinge attachment 83 to rotatable seat back 79 and at its other end by resting on the extended food tray 93 or other extendable structure on the seat back. Hook 91 can also be used to engage the food tray 93 to further restrain seat pad 77 from possibly lifting up. It will be understood that many different approaches for securing portions of the seat in different positions can be used.

Figure 8:
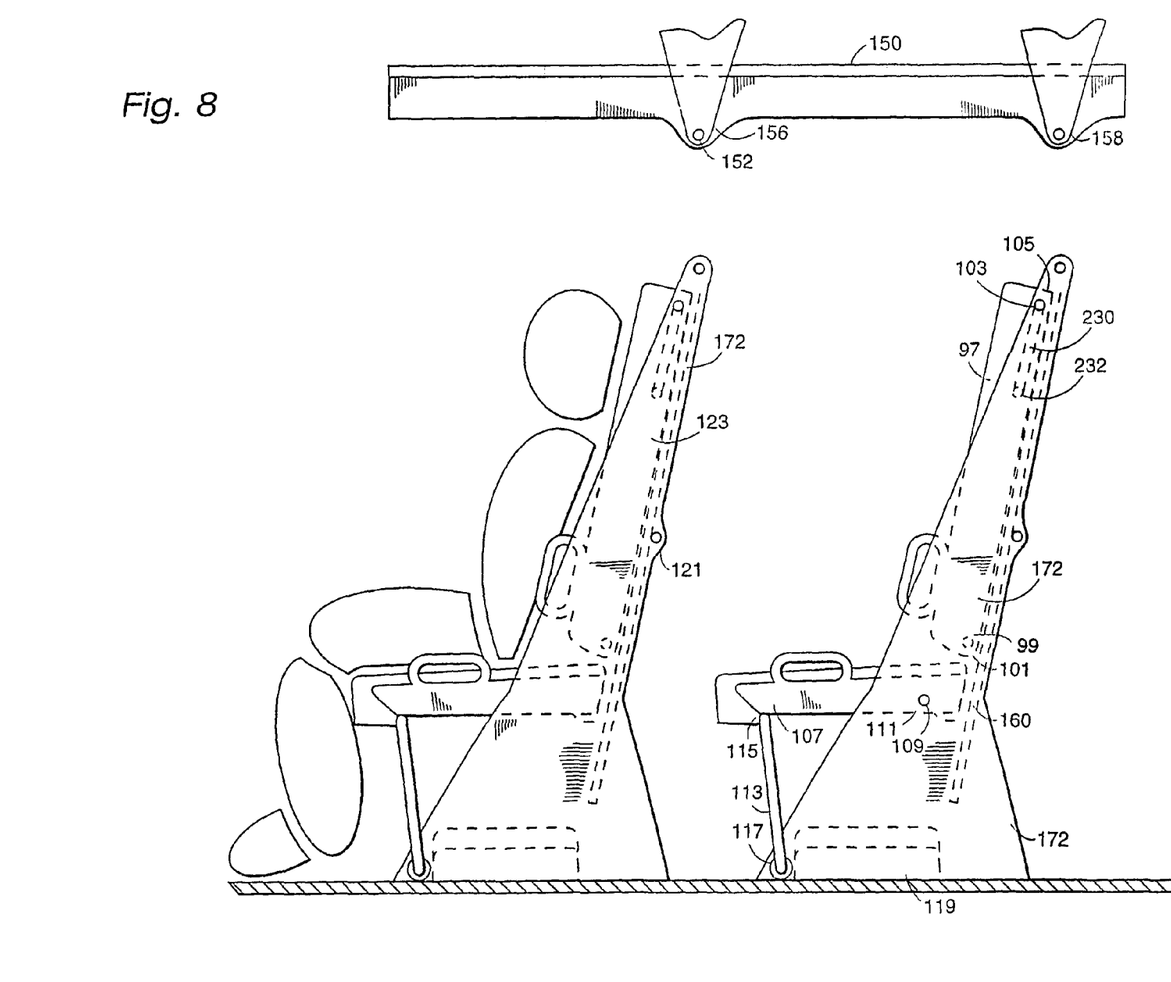
FIG. 8 is a side view of a third embodiment of the invention configured as conventional seats.
Figure 9:
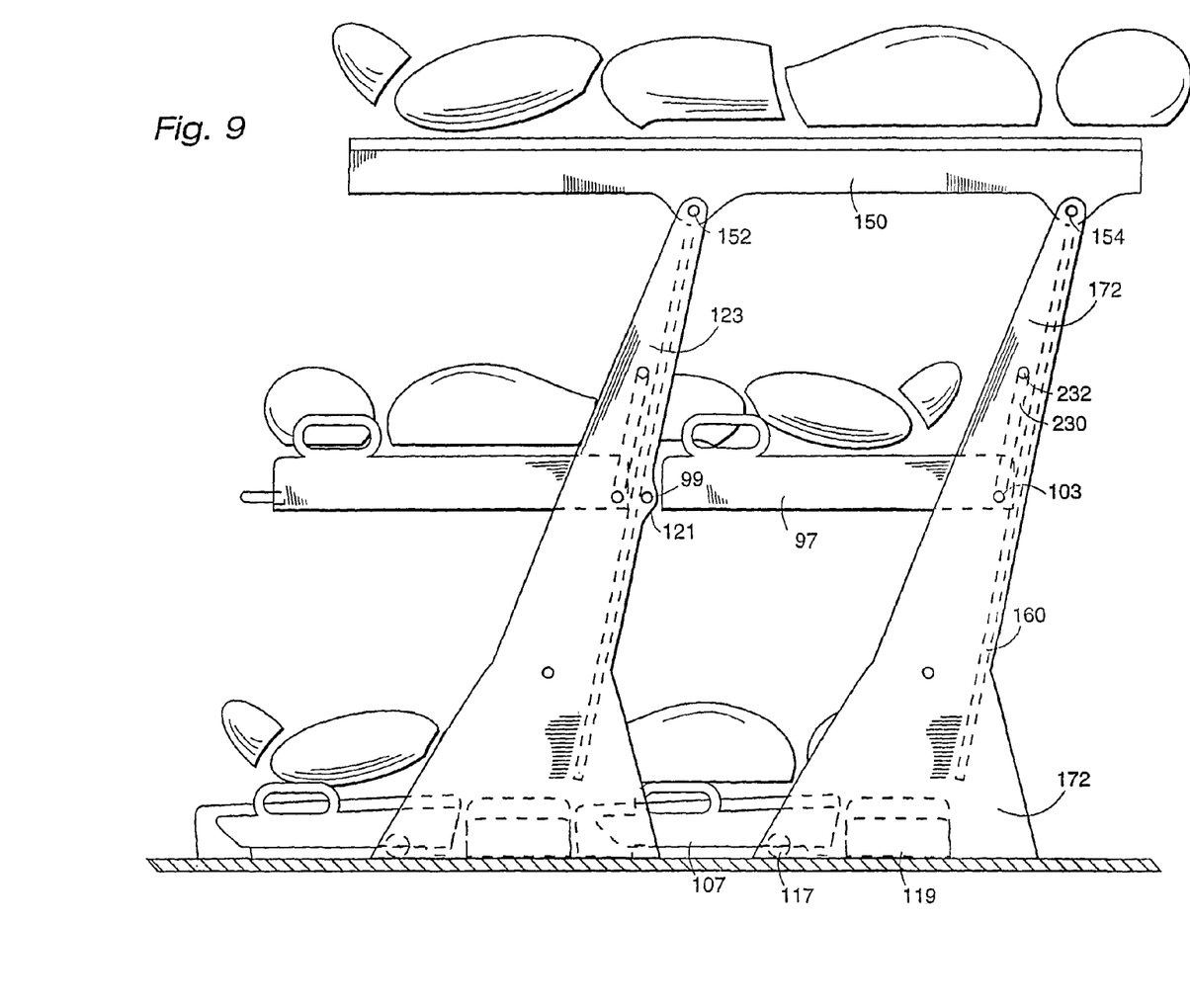
FIG. 9 is a side view of the embodiment of FIG. 8 after conversion of the seats to three level bunk beds.

The upper bunk structure is held up by the seats and potentially can be secured or restrained by the seats from moving left and right but the upper bunk structure can have a fore and aft connection closer to the ceiling so that the upper bunk structure helps to reduce or even eliminate the seat induced floor buckling loads during a crash that are present in conventional seat designs Referring now to FIGS. 8 and 9, a third alternative embodiment of the invention is illustrated, showing still another way to convert the seat pad 107 and seat back 97 into bunk beds. This embodiment also shows one way to handle a configuration with only one- or two-abreast seating instead of three-abreast. This arrangement is typical of passenger trains and some smaller airliners. In this situation the passengers do not have enough space to stretch out at right angles to the aisle as in the the preferred approach but instead can stretch out facing fore and aft or alternatively partly fore and aft and partly inboard and outboard in the space that was previously occupied by two rows of seats. This embodiment also shows the upper bunk 150 retracting up against the ceiling when not in use as shown in FIG. 8.

Seat pad 107 is secured in position by spring loaded sliding pin 109 that engages a hole 111 in the seat side panel structure 172 and by supporting member 113 that is connected by a pivot 115 to the seat pad 107 and pivot 117 to the floor structure. To create the lower bunk, spring loaded sliding pin 109 is retracted allowing seat pad 107 to move forward and down onto the floor in front of fixed floor pad 119. The same process is used for the seat in front and the passenger in the lower bunk lies across all four of these floor pads as shown in FIG. 9.

Seat back 97 has a pin 99 that engages a hole 101 in seat side panel structure 172 to secure the lower end of seat back 97 as shown in FIG. 8. The top of seat back 97 has a rod 103 which extends the full width of the seat back 97 and is free to rotate about its lengthwise axis relative to seat back 97 similar to rod 33 shown in FIGS. 1 and 5. Rod 103 attaches to rod 230 and a mirror image rod to rod 230 on the other side of the seat back. Rod 230 in turn is rotatably attached to seat side panel structure 172 at point 232. To create the middle bunk, pin 99 is retracted to free the lower end of the seat back 97. Rod 230 is rotated counter-clockwise about point 232 to lower the upper end of the seat pad 97 to the position shown in FIG. 9, and pin 99 engages a hole 121 in the seat side panel structure 123 of the seat in front. Because rod 230 and its mirror image rod on the other side of the seat back 97 are both connected to rod 103, they rotate together making it easier to convert the seat to a bunk and vice versa from only one side of the seat.

Bunk 150 has pins 152 and 154 which engage brackets 156 and 158 to hold the closest side of the bunk 150 up against the ceiling in the retracted position. Identical pins and brackets hold up the back side. To lower the upper bunk 150, pins 152 and 154 are retracted with the same kind of mechanism as ilustrated in FIG. 5, and the bunk 150 is manually lowered by two people clear of brackets 156 and 158 and pins 152 and 154 again re-engage holes in the top of the seat side panel structure 172 as shown in FIG. 9. Although only one approach is shown for raising and lowering an upper bunk, other approaches are possible such as supporting arms for the bunk that rotate up or down or tracks that support and guide the bunk up and down.

Figure 10:
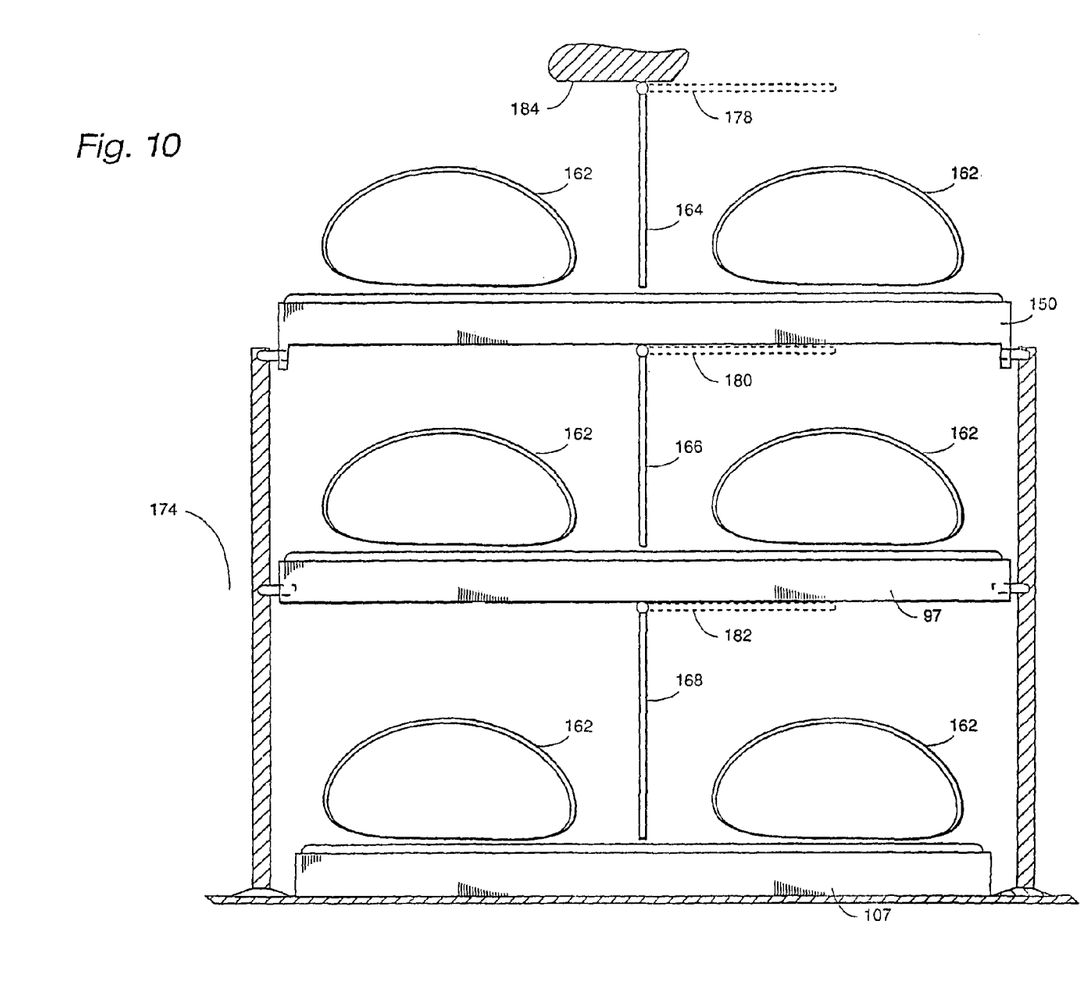
FIG. 10 is a view of the embodiment of FIG. 9 looking forward or aft showing the retractable partitions between passengers.

When passengers lie forward or aft and parallel to the aisle then every other row of seats would have a partition 160 to provide privacy between one passenger and the next, and every other row of seats would be open to allow the passenger to lie fore and aft across two rows of seats. For configurations described previously such as in FIGS. 1, 2 and 3 where passengers lie perpendicular to the aisle there preferably is a partition on the back of every seat to provide privacy between passengers when in their bunks. The largest negative of having passengers lie fore and aft and parallel to an aisle is that it is more difficult to provide partitions between passengers, and every passenger needs to be next to an aisle or it can be claustrophobic and someone has to get up to let someone out or someone has to crawl over a potential stranger. This problem is reduced for the center row of seats in a twin aisle airliner. Three abreast seating can provide a good width for two side-by-side bunks facing fore and aft where both passengers have access to an aisle such as shown in FIG. 10. However extendable/retractable partitions such as shown in FIG. 10 need to be incorporated or passengers are potentially lying next to strangers.

FIG. 10 is a view looking forward or aft at passengers 162 lying in their bunk beds with an aisle 174 and 176 on the left and right sides of the bunks. Partitions 164, 166, and 168 for the upper, middle and lower bunk respectively are shown in their extended position providing a wall between adjacent passengers that would otherwise be lying next to a potential stranger. Partition 164 is attached to the ceiling 184 and partitions 166 and 168 are attached to the bottom sides of bunks 150 and 97 respectively. When converted to conventional seats or if married couples want to be together these partitions 164, 166 and 168 are rotated to their positions 178, 180 and 182 respectively as shown in dashed lines. These partitions could also be fabric curtains.

Figure 7:
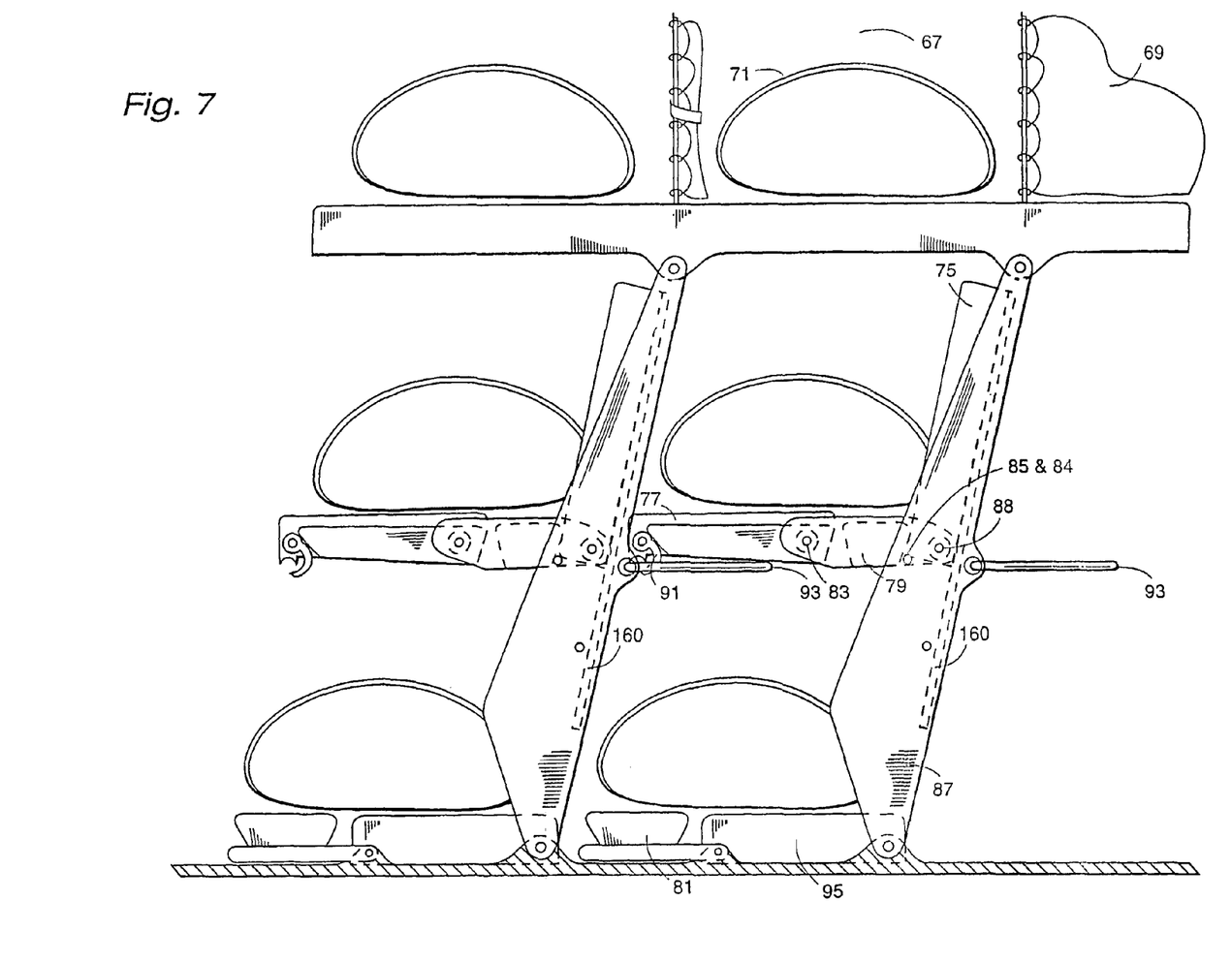
FIG. 7 is a side view of the embodiment of FIG. 6 after conversion to three-level bunk beds.

Although all the configurations in FIGS. 1 to 10 can have the passengers facing parallel to the aisles when prone as described for the configuration in FIGS. 8, 9 and 10, the mechanism used in FIGS. 1, 2 and 3 is preferred when a three level bunk bed is used whether the passengers lie prone parallel or at right angles to the aisles. When passengers lie at right angles to the aisle there generally are partitions 160 on the backs of every group of side-by-side seats as shown in FIGS. 6 and 7 to provide privacy between passengers. Partitions 160 also are preferably structural or have structural cross members in them in that they stabilize the upper bunk and middle bunks from side to side movement as seen in FIGS. 4, 5 and 10 (or what would appear as movement toward and away from the plane of FIGS. 1, 2, 3, 6, 7, 8 and 9) by connecting the left and right seat side panel structure 9, 87 or 172 with a shear web or cross structural members from upper left to lower right seat side panel structure and/or vice versa. For example in FIG. 5, although it is not shown for clarity, there would be a shear panel across the back of the seat hiding most of the drawing details or there would be at least one structural member running from the lower left seat side panel structure 9 to the upper right seat side panel structure 82 or vice versa.

When passengers lie parallel to the aisles, partitions 160 are only on the backs of every other group of side-by-side seats as shown in FIGS. 8 and 9 unless banks of side-by-side seats alternate facing forward and backward.

It is harder to stabilize bunk beds that do not have these shear webs or cross-ties on the backs of the seat; however, another efficient means is a structural attachment 220 to the aircraft side wall 214 as shown in FIG. 5.

Privacy between passengers in the upper bunks can be achieved with retractable partitions 8 which rotate about attach point 210 and are shown in their retracted and extended positions respectively in FIGS. 1 and 2. Partitions 8 are in their retracted and down position when passengers are seated for improved cabin visibility and if a couple on adjacent upper bunks want to combine their bunks.

There are at least six ways to allow for sixteen-g crash loads and not have head trauma from the passengers hitting their heads on the seat backs in front of them. The passengers can be facing backwards or alternating facing forward and backwards or they can use shoulder straps or air bags in the seat belts or heavily padded seat backs or the seat back in front can be designed to deflect forward during a crash like most current airliner seats. To design the seat in front to tilt forward during a crash, the seat side support structure 9 above the pins 12 and 78 could be designed to yield under crash loads or the attachment of rod 204 to seat side support structure 9 at point 7 could be designed to fail during high deceleration loads so that the seat back 5 will rotate forward about pins 12 and 78. An interference between the padding and structure at the bottom of the seat back 5 and the seat pan 13 absorbs some of the crash energy and restrains the seat back 5 from rotating so far forward as to crush the passenger in that seat. Other approaches are of course possible such as a mechanical hinge in seat side support structure 9, etc. Allowing the seat back to rotate forward reduces floor buckling loads during a crash.

Although all configurations shown have passengers sitting facing in one direction it should be understood that alternate rows could face in opposite directions. In fact for the embodiment shown in FIGS. 6 and 7 it would be necessary to have even and odd rows face in different directions to allow the approach of having passengers in bunk bed configuration lie facing fore and aft across two rows of seats without interference from the seat back which remains in a fixed vertically oriented position.

All of the configurations shown have utilized the seat structure in front to support the front end of the bunks when in the bunk bed configuration for a lightweight design. It is also understood that the first row in a row of seats will need a support structure in front of that first row of seats to provide this equivalent support. The same kind of structure is required between every row of seats where the alternating rows face in different directions since there is no good seat structure directly in front of any of the seats to provide support for the bunks when in the bunk bed configuration. It is understood that other approaches to support the extended side of the bunks such as braces, extendable or fixed legs, brackets on the side wall of the aircraft adjacent to the seat, etc. are all possible.

In almost all modes of transportation there is not enough room for a four level bunk bed arrangement. However a four level bunk bed could be achieved by installing over the preferred embodiment of FIGS. 1, 2 and 3, the upper bunk design of FIGS. 8 and 9 or a similar bunk arrangement that is fixed or can retract up against the ceiling.

Four of five abreast seating which can be found on some airliners in the middle section between two aisles can be treated as a row of three abreast next to a row of one or two abreast seats. For example, three abreast of the side-by-side seats that abut one aisle could convert to bunk beds where passengers lie crosswise to the aisle such as shown in FIGS. 1 through 3 and the remaining one or two abreast seats that abut the other aisle could stay conventional seats or convert so that passengers lie parallel to the aisle such as shown in FIGS. 8 and 9 as previously described.

A high density economy class configuration was shown for all the examples since it is the most difficult case to accommodate. For business or first class the seat pitch could be increased (seat pitch is the distance from one row of seats to the same point on the seats in front of it), and/or the width of the seats per passenger could be increased. Also the passenger can be given more headroom when in the bunk bed configuration by having only two levels of bunk beds instead of three. The configurations depicted in FIGS. 6 through 10 can achieve this for example by eliminating the upper bunk and respacing the bunks so that they have approximately the same headroom when in the bunk bed configuration.

Night flights could become even more popular especially for shorter flights if these same type is of convertible seats are incorporated into the waiting lounges at the gates. During the day they would be primarily configured as conventional seats. However passengers going on a trip who do not want to waste daylight hours traveling and/or do not want the added expense and bother of getting a hotel room at the start and/or end of their trip and/or want cheaper night fares could do the following: arrive at the airport, check their bags and go to their gate at a time when they would normally be going to sleep even though their flight might not be for several hours. The seats at the gate would be configured to sleeper bunks so that passengers could sleep until awakened by the airline representative when it is their turn to board. At the end of the flight if its too early for them to go to their meeting or final destination they could again sleep in convertible bunks until the morning when the seats are again needed for daytime flights. Since people sleep in the airports anyway especially when there are long delays, and so on, why not make them more comfortable there as well as when they are traveling on the aircraft?

What is claimed is:

1. Side-by-side vehicle seats arranged in front of other side-by-side seats to form a row with an isle on at least one side with seats facing primarily parallel to the isle, wherein the seats convert to bunk beds and wherein after conversion to bunk beds, the longest dimension of at least one of said bunk beds lies closer to perpendicular than parallel to said aisle, where said seats have a seat pad and a seat pad extension and during conversion to bunk beds said seat pad remains relatively fixed in its horizontal position while said seat pad extension moves into a position in plane with said seat pad and in front of said seat pad to form a bunk.

2. A system of seats that convert to bunk beds comprising a first set of side-by-side seats facing in a first direction and situated behind and adjacent to a second set of side-by-side seats also facing in said first direction, said first seats comprising a seat pad and a seat back and structure to support said seat pad and said seat back, wherein after conversion to bunk beds the longest dimension of at least one of said bunk beds lies more ross-wise than parallel to said first direction, whereby a passenger when in a seated position faces in said first direction but when lying prone said same passenger lies more cross-wise than parallel to said first direction.

3. The system of claim 2 further comprising vertically oriented dividers on both longer sides of a bunk bed to provide privacy for prone passengers from adjacent passengers on both sides.

4. The system of claim 2 wherein said seats are mounted in an airliner, and wherein an aisle runs parallel to said first direction on at least one side of said seats, said first direction being parallel to the direction of travel.

5. The system of claim 4 where there is an opening above said seats when said seats are not configured as bunk beds that extends low enough to provide enough cabin visibility parallel to the aisle that any passenger that stands up from his seat in an emergency can be observed by at least one seated flight attendant.

6. The system of claim 5 wherein the bunk beds are three level bunk beds.

7. The system of claim 2 wherein said seat pads can be raised or lowered.

8. The system of claim 2 wherein one of the bunks is comprised in whole or in part by the seat back rotated to a horizontal position.

9. The system of claim 8 in which the bottom of said seat back when passengers are in a seated position is raised when converting to a bunk bed arrangement.

10. The system of claim 2 in which a partition is oriented substantially cross-wise to said first direction to provide privacy between passengers when lying prone.

11. The system of seats of claim 2 wherein the seat backs are designed to deflect forward in a crash to minimize floor loads or reduce the potential for head trauma for a passenger sitting behind the seat.

12. The system of seats of claim 11 where said seat back rotates to the horizontal to form part or all of a bunk bed.

13. The system of claim 2 wherein the height of a first bunk can be adjusted to effectively raise or lower the hips of the occupant when lying prone in said first bunk while still allowing a second occupant to lie prone in a second bunk above or below said first bunk independent of the two positions of said first bunk.

14. The system of claim 2 where said seats are mounted in a vehicle.

15. The system of claim 2 where said bunk beds are three level bunk beds.

16. The system of claim 15 where a pad at floor level forms the lowest bunk.

17. The system of claim 16 where said pad at floor level is designed so that the portion of the pad directly under the passenger's feet when seated can be folded back or removed from the floor.

18. The system of claim 2 where said the seat pad is raised or lowered to form a portion of a bed.

19. The system of claim 18 where said seat pad is raised or lowered using a structural link that is rotatably attached to said seat pad and rotatably attached to said seat pad support structure, said structural link rotating about a horizontal axis parallel to the long axis of said bed when raising or lowering said seat pad.

20. The system of claim 2 where after conversion to bunk bed configuration said seat pad and a seat pad extension are positioned in generally the same horizontal plane and form a bunk of said bunk bed system between the backs of the first and second set of side-by-side seats.

21. The system of claim 2 wherein said first set of side-by-side seats and said second set of side-by-side seats being arranged to form rows with an aisle on at least one side of said seats with seats facing primarily parallel to the aisle.

22. A system of eats that convert to bunk beds comprising a first set of side-by-side seats facing in the first direction and situated behind and adjacent to a second set of side-by-side seats also facing in said first direction, said first seats comprising a seat pad and a seat back and structure to support said seat pad and seat back, wherein after conversion to bunk beds the longest dimension of at least one of said bunk beds lies more cross-wise than parallel to said first direction, whereby a passenger when in a seated position faces in said first direction but when lying prone said same passenger lies more cross-wise than parallel to said first direction, wherein a cutout in a bunk is provided to improve access in and out of said bunk.

23. The system of claim 22 further comprising a trap door filling in said cut out and providing a full bunk bed area when said cut out is not being used for entry or exit from said bunk.

24. A system of seats that convert to bunk beds comprising a first set of side-by-side seats facing in a first direction and situated behind and adjacent to a second set of side-by-side seats also facing in said first direction, said first seats comprising a seat pad and said seat back, wherein after conversion to bunk beds the longest dimension of at least one of said bunk beds lies more cross-wise than parallel to said first direction, whereby a passenger when in a seated position faces in said first direction but when lying prone said same passenger lies more cross-wise than parallel to said first direction, said seat back rotating to create all or part of an upper bunk, said upper bunk being supported by seat back support structure from said first and second seats.

25. Side-by-side seats of claim 24 in which said seats are mounted in an airliner.

26. The system of claim 24 where said seat back creates an entire bunk.

27. A system of seats that covert to bunk beds comprising a first set of side-by-side seats facing in a first direction and situated behind and adjacent to a second set of side-by-side seats also facing in said first direction, said first seats comprising a seat pad and said seat back and structure to support said seat pad and said seat back, wherein after conversion to bunk beds the longest dimension of at least one of said bunk beds lies more cross-wise than parallel to said first direction, whereby a passenger when in a seated position faces in said first direction but when lying prone said same passenger lies more cross-wise than parallel to said first direction, wherein after conversion to bunk bed configuration said seat pad and a seat pad extension fill in the space between the front of said first set of side-by-side seats and the back of the second set of side-by-side seats in front to from a bunk of said bunk bed system.

28. The system of claim 27 where said seat pad extension is supported when in the bunk bed configuration by the support structure of said second set of side-by-side seats.

29. A system of vehicle seats that convert to bunk beds comprising a first set of side-by-side seats situated behind and adjacent to a second set of side-by-side seats, said first seats comprising a seat pad and a seat back and structure to support said seat pad said seat back, wherein after conversion to bunk beds, the longest axis of the first bunk bed of said first seats lies perpendicular to the direction that passengers face while seated, said first bunk bed has partitions located adjacent to both longest sides of said first bunk bed and said first bunk bed utilizes components only from said first and second sets of side-by-side seats, said components comprising said seat pad from said first seats and a seat pad extension, said seat pad extension filing in the space between the front of said seat pad and the back of said second seats.

30. A system of vehicle seats that convert to bunk beds comprising a first set of side-by-side seats situated behind and adjacent to a second set of side-by-side seats, said first seats comprising a seat pad and a seat back and structure to support said seat pad and said seat back, wherein after conversion to bunk beds, the longest axis of the first bunk bed of said first seats lies perpendicular to the direction that passengers face while seated, said first bunk bed has partitions located adjacent to both longest sides of said first bunk bed and said first bunk bed utilizes components only from said first and second seats of side-by-side seats, said partitions being the backs of the support structures of said first and second seats.

31. A system of seats that convert to beds comprising a first set of side-by-side seats facing in a first direction and situated behind and adjacent to a second set of side-by-side seats also facing in said first direction, said first seats comprising a seat pad and a seat back and structure to support said seat pad and said seat back, wherein after conversion to a bed, the longest dimension of the bed lies cross-wise of said first direction, and said bed is made up of a seat pad and a seat pad extension that are generally in a plane with each other and are wider than the seat pad by itself.

32. The system of seats of claim 31 where said seat pad extension fills in the space between the front of said seat pad and the back of said second set of side-by-side seats.

33. A system of seats that convert to bunk beds comprising a first set of side-by-side seats facing in a first direction and situated behind and adjacent to a second set of side-by-side seats also facing in said first direction, said first seats comprising a seat pad and a seat back and structure to support said seat pad and said seat back, at least a part of said seat back rotating upward to create all or part of an upper bunk, said upper bunk being supported by seat back support structure from said first and second seats.

* * * * *